United States Patent
Takemori

(10) Patent No.: US 11,890,898 B2
(45) Date of Patent: Feb. 6, 2024

(54) PNEUMATIC TIRE

(71) Applicant: The Yokohama Rubber Co., LTD., Tokyo (JP)

(72) Inventor: Ryohei Takemori, Kanagawa (JP)

(73) Assignee: The Yokohama Rubber Co., LTD., Toyko (JP)

(*) Notice: Subject to any disclaimer, the term of this patent is extended or adjusted under 35 U.S.C. 154(b) by 379 days.

(21) Appl. No.: 17/283,173

(22) PCT Filed: Oct. 10, 2019

(86) PCT No.: PCT/JP2019/039962
§ 371 (c)(1),
(2) Date: Apr. 6, 2021

(87) PCT Pub. No.: WO2020/085100
PCT Pub. Date: Apr. 30, 2020

(65) Prior Publication Data
US 2021/0339582 A1  Nov. 4, 2021

(30) Foreign Application Priority Data
Oct. 26, 2018 (JP) .................. 2018-201625

(51) Int. Cl.
| B60C 15/06 | (2006.01) |
| B60C 17/00 | (2006.01) |
| B60C 15/00 | (2006.01) |
| B60C 9/20  | (2006.01) |

(52) U.S. Cl.
CPC ...... *B60C 17/0009* (2013.01); *B60C 15/0036* (2013.01); *B60C 15/0603* (2013.01);
(Continued)

(58) Field of Classification Search
CPC ........... B60C 17/0009; B60C 17/0018; B60C 17/0027; B60C 17/0036; B60C 17/0045;
(Continued)

(56) References Cited

U.S. PATENT DOCUMENTS

2013/0199688 A1\* 8/2013 Nakazaki ............... B60C 17/00
152/517
2015/0202929 A1  7/2015 Horiuchi
(Continued)

FOREIGN PATENT DOCUMENTS

| CN | 104321209 A | 5/2015 |
| CN | 109070661 A | 12/2018 |

(Continued)

OTHER PUBLICATIONS

Machine Translation: JP-2012096656-A, Niizawa T (Year: 2023).\*
Machine Translation: JP-2014201230-A, Takahashi Y (Year: 2023).\*

*Primary Examiner* — Kendra Ly
(74) *Attorney, Agent, or Firm* — Thorpe North & Western

(57) ABSTRACT

A pneumatic tire is provided. A bead filler is disposed on an outer circumferential side of each bead core in bead portions, a side reinforcing layer having a crescent-shaped cross-section is disposed on an inner side in a tire width direction of a carcass layer in a sidewall portion, and as physical properties of a rubber that constitutes the side reinforcing layer and a rubber that constitutes the bead filler, a modulus at 100% elongation is in a range from 8.4 MPa to 10.2 MPa, a tan δ at 60° C. is in a range from 0.04 to 0.08, and JIS hardness at 20° C. is in the range from 75 to 79.

8 Claims, 1 Drawing Sheet

(52) U.S. Cl.
CPC ............... *B60C 2009/2016* (2013.01); *B60C 2009/2019* (2013.01); *B60C 2015/061* (2013.01); *B60C 2015/0621* (2013.01); *B60C 2017/0054* (2013.01); *B60C 2017/0063* (2013.01); *B60C 2017/0072* (2013.01)

(58) Field of Classification Search
CPC .... B60C 2017/0054; B60C 2017/0063; B60C 2017/0072
See application file for complete search history.

(56) References Cited

U.S. PATENT DOCUMENTS

2016/0031267 A1* 2/2016 Horiuchi ............ B60C 11/0304
152/209.9
2019/0135052 A1 5/2019 Ogawa et al.

FOREIGN PATENT DOCUMENTS

| | | |
|---|---|---|
| DE | 11 2018 005 545 T5 | 6/2020 |
| EP | 3450220 A1 | 3/2019 |
| JP | H07-304312 A | 11/1995 |
| JP | 2004-231922 A | 8/2004 |
| JP | 2007-69890 A | 3/2007 |
| JP | 2009-061866 A | 3/2009 |
| JP | 2010-6327 A | 1/2010 |
| JP | 2010-155549 A | 7/2010 |
| JP | 2012-96656 A | 5/2012 |
| JP | 2012096656 A * | 5/2012 |
| JP | 2013-95369 A | 5/2013 |
| JP | 2014-201230 A | 10/2014 |
| JP | 2014201230 A * | 10/2014 |
| WO | 2017/188408 A1 | 11/2017 |

* cited by examiner

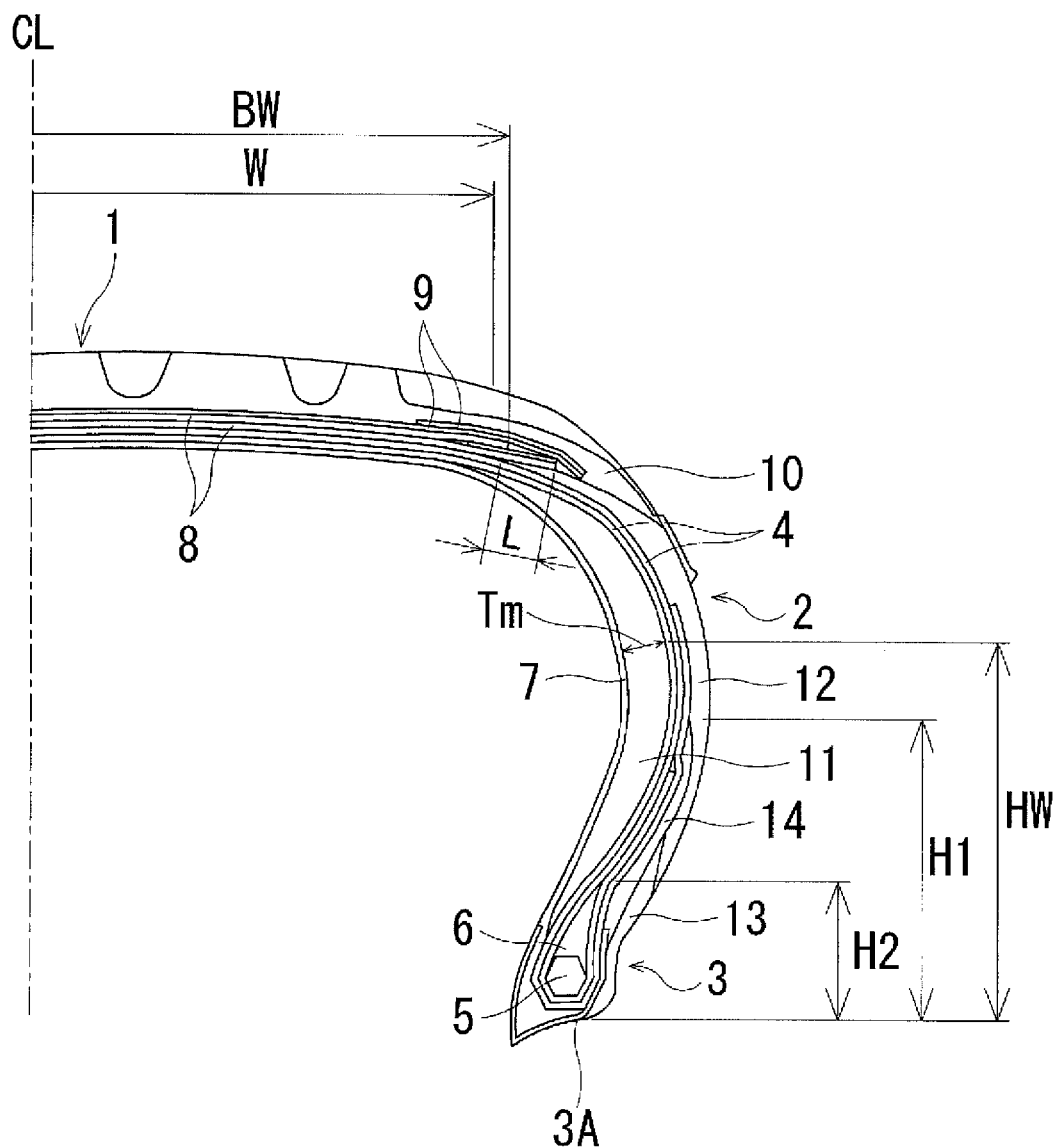

PNEUMATIC TIRE

TECHNICAL FIELD

The present technology relates to a pneumatic tire and more particularly relates to a pneumatic tire that can provide reduced rolling resistance while improving run-flat durability and can provide improved ride comfort under normal travel conditions.

BACKGROUND ART

In the pneumatic tires that can travel while flat, a side reinforced type run-flat tire that includes a run-flat reinforcing layer having a crescent shaped cross-section disposed on the inner surface side of the sidewall portion is known (see, for example, Japan Unexamined Patent Publication Nos. H07-304312 and 2009-061866). In such a run-flat tire, when the volume of a rubber that constitutes a side reinforcing layer is increased to suppress deflection under run-flat travel conditions, heat build-up is promoted and rolling resistance is increased, and there is a problem in that ride comfort under normal travel conditions deteriorates due to an increase in side rigidity.

SUMMARY

The present technology provides a pneumatic tire that can provide reduced rolling resistance while improving run-flat durability and can provide improved ride comfort under normal travel conditions.

A pneumatic tire according to an embodiment of the present technology includes: a tread portion having an annular shape and extending in a tire circumferential direction; a pair of sidewall portions disposed on both sides of the tread portion; and a pair of bead portions disposed on inner sides in a tire radial direction of the pair of sidewall portions, at least one carcass layer being mounted between the pair of bead portions, the carcass layer being turned up from a tire inner side to a tire outer side around a bead core of each of the bead portions, a bead filler being disposed on an outer circumferential side of the bead core in each of the bead portions, a plurality of belt layers being disposed on an outer circumferential side of the carcass layer in the tread portion, and a side reinforcing layer having a crescent-shaped cross-section being disposed on the inner side in a tire width direction of the carcass layer in each of the pair of sidewall portions, wherein as physical properties of a rubber that constitutes the side reinforcing layer and a rubber that constitutes the bead filler, a modulus at 100% elongation is in a range from 8.4 MPa to 10.2 MPa, a tan δ at 60° C. is in a range from 0.04 to 0.08, and JIS (Japanese Industrial Standard) hardness at 20° C. is in a range from 75 to 79.

In embodiments of the present technology, as the physical properties of the rubber that constitutes the side reinforcing layer and the rubber that constitutes the bead filler, since the modulus at 100% elongation is in the range from 8.4 MPa to 10.2 MPa, the generation of peeling off of the carcass layer located between the side reinforcing layer and the bead filler can be prevented, and run-flat durability can be improved. In addition, since the rubbers have the tan δ at 60° C. in the range from 0.04 to 0.08 and are low heat build-up rubbers, heat build-up under run-flat travel conditions is suppressed, and rolling resistance can be reduced. Furthermore, since the JIS hardness at 20° C. is in the range from 75 to 79, run-flat durability and ride comfort under normal travel conditions can be improved in a well-balanced manner. By setting the physical properties of the rubbers that constitute each of the side reinforcing layer and the bead filler in a specific range in this way, the difference in the physical properties between the rubber that constitutes the side reinforcing layer and the rubber that constitutes the bead filler can be reduced without increasing the cross-sectional area or the thickness of the rubber that constitutes the side reinforcing layer. In this way, rolling resistance can be reduced while improving run-flat durability, and ride comfort under normal travel conditions can be improved.

In embodiments of the present technology, an outer reinforcing layer that overlaps the bead filler and the side reinforcing layer in the tire radial direction is preferably disposed on an outer side in the tire width direction of the carcass layer in each of the pair of sidewall portions. In this way, casing stiffness can be effectively improved, and shear stress applied to the carcass layer under run-flat travel conditions can be suppressed while avoiding adverse effects on ride comfort under normal travel conditions.

In embodiments of the present technology, a height HW from a bead heel of each of the pair of bead portions to a maximum thickness position of the side reinforcing layer and a height H1 from the bead heel of each of the pair of bead portions to an outer end portion in the tire radial direction of the outer reinforcing layer preferably satisfy the relationship $0.6 \leq H1/HW \leq 0.8$. In this way, deformation around the bead portions is suppressed, and a bend point of the sidewall portion under run-flat travel conditions is moved toward a side of the tread portion, and run-flat durability can be effectively improved.

In embodiments of the present technology, as physical properties of a rubber that constitutes the outer reinforcing layer, a modulus at 100% elongation is preferably in a range from 5.2 MPa to 6.4 MPa, and JIS hardness at 20° C. is preferably in a range from 70 to 74. In this way, ride comfort under normal travel conditions can be improved while maintaining run-flat durability.

In embodiments of the present technology, a height HW from a bead heel of each of the pair of bead portions to a maximum thickness position of the side reinforcing layer and a height H2 from the bead heel of each of the pair of bead portions to an outer end portion in the tire radial direction of the bead filler preferably satisfy the relationship $0.35 \leq H2/HW \leq 0.50$. In this way, the bend point of the sidewall portion under run-flat travel conditions is moved toward the side of the tread portion, and thus the tire weight can be reduced while maintaining run-flat durability even when the side reinforcing layer is made thinner than in the related art.

In embodiments of the present technology, a ratio of the width of the belt layer located on the outermost side in the tire radial direction to a ground contact width is in a range from 101% to 110%, and an amount of overlap between the belt layer located on the innermost side in the tire radial direction and the side reinforcing layer is preferably in a range from 15 mm to 30 mm. In this way, run-flat durability can be effectively improved.

In embodiments of the present technology, a cord angle of the belt layers with respect to the tire circumferential direction is preferably in a range from 25° to 35°, and preferably at least one belt cover layer that covers an entire width of the belt layer is disposed on an outer circumferential side of the belt layers. In this way, buckling of the tread portion is suppressed, and run-flat durability can be effectively improved.

In embodiments of the present technology, the modulus at 100% elongation used to specifying rubber physical properties refers to the measurement result of modulus at 100% elongation when a tensile test is performed at room temperature on a rubber sample having a shape according to No. 3 dumbbell in accordance to the JIS-K 6251. The tan δ (60° C.) refers to the measurement result under the condition of a frequency of 20 Hz, an initial strain of 10%, a dynamic strain of ±2%, and a temperature of 60° C. using a viscoelastic spectrometer, according to the JIS-K 6934. The JIS hardness (20° C.) is the durometer hardness measured under the condition of a temperature of 20° C. using a type A durometer, according to the JIS-K 6253. Furthermore, in embodiments of the present technology, the ground contact width is the maximum linear distance in a tire axial direction at a contact surface with a flat surface when the tire is mounted on a standard rim of JATMA, applied with a load of 70% of a load capacity when inflated to an internal pressure of 230 kPa, and placed vertically on the flat surface.

BRIEF DESCRIPTION OF DRAWING

The drawing is a meridian cross-sectional view illustrating an example of a pneumatic tire according to an embodiment of the present technology.

DETAILED DESCRIPTION

Configurations of embodiments of the present technology will be described in detail below with reference to the accompanying drawing. The drawing illustrates one example of a pneumatic tire according to an embodiment of the present technology.

As illustrated in the drawing, the pneumatic tire according to the present embodiment includes an annular tread portion 1 extending in a tire circumferential direction, a pair of sidewall portions 2 disposed on both sides of the tread portion 1, and a pair of bead portions 3 disposed on an inner side in a tire radial direction of the pair of sidewall portions 2. In the drawing, only the half cross-section on one side in a tire width direction delimited by a tire center line CL is illustrated, but the pneumatic tire has a symmetrical structure on both sides of the tire center line CL. Obviously, an asymmetrical structure may be employed.

At least one carcass layer 4 (two layers in the drawing) is mounted between the pair of left and right bead portions 3, 3. Each end portion of the carcass layer 4 is turned up from a tire inner side to a tire outer side around a bead core 5 disposed in each of the bead portions 3. A bead filler 6 having a triangular cross-sectional shape formed from rubber is disposed on a tire outer circumferential side of each of the bead cores 5. The carcass layer 4 wraps around the bead filler 6, extends to the vicinity of the sidewall portions 2, and terminates. An innerliner layer 7 is disposed in a region between the pair of left and right bead portions 3, 3 in a tire inner surface.

A plurality of belt layers 8 (two layers in the drawing) are embedded on a tire outer circumferential side of the carcass layer 4 in the tread portion 1. The belt layers 8 include a plurality of reinforcing cords that are inclined with respect to the tire circumferential direction, with the reinforcing cords of the different layers disposed in a criss-cross manner. Steel cords are preferably used as the reinforcing cords of the belt layers 8. To improve high-speed durability, at least one belt cover layer 9 (two layers in the drawing) formed by being arranged at an angle of not greater than 5° with respect to the tire circumferential direction is disposed on a tire outer circumferential side of the belt layers 8. In an aspect of the drawing, the belt cover layer 9 located on the inner side in the tire radial direction constitutes a full cover that covers the entire width of the belt layers 8, and the belt cover layer 9 located on an outer side in the tire radial direction constitutes an edge cover layer that covers only end portions of the belt layers 8. Organic fiber cords such as nylon and aramid are preferably used as the reinforcing cords of the belt cover layer 9.

A tread rubber layer 10 is disposed on an outer circumferential side of the belt layers 8 and the belt cover layer 9 in the tread portion 1. A side reinforcing layer 11 having a crescent-shaped cross-section to enable run-flat travel is disposed between the carcass layer 4 and the innerliner layer 7 in the sidewall portions 2. The side reinforcing layer 11 and the bead filler 6 overlap in the tire radial direction. In the overlapping portion of the side reinforcing layer 11 and the bead filler 6, a length measured along the tire radial direction is preferably in the range from 15 mm to 30 mm. A side rubber layer 12 is disposed on an outer circumferential side of the carcass layer 4 (an outer side in the tire width direction) in the sidewall portions 2. A rim cushion rubber layer 13 is disposed on the outer circumferential side of the carcass layer 4 (the outer side in the tire width direction) in the bead portions 3.

In the pneumatic tire described above, the rubber that constitutes the side reinforcing layer 11 and the rubber that constitutes the bead filler 6 have the following physical properties. Both the rubber that constitutes the side reinforcing layer 11 and the rubber that constitutes the bead filler 6 have a modulus M100 at 100% elongation in the range from 8.4 MPa to 10.2 MPa. In particular, a modulus $M100_{BF}$ of the rubber that constitutes the bead filler 6 is preferably greater than a modulus $M100_{SL}$ of the rubber that constitutes the side reinforcing layer 11, and the difference between both the moduli $(M100_{BF}-M100_{SL})/M100_{BF}$ is more preferably not greater than 10%.

Furthermore, both the rubber that constitutes the side reinforcing layer 11 and the rubber that constitutes the bead filler 6 have a tan δ at 60° C. in the range from 0.04 to 0.08. In particular, the tan δ at 60° C. is preferably in the range from 0.05 to 0.07. Furthermore, a $\tan \delta_{BF}$ at 60° C. of the rubber that constitutes the bead filler 6 is more preferably greater than a $\tan \delta_{SL}$ at 60° C. of the rubber that constitutes the side reinforcing layer 11, and the difference between both the tan δ $(\tan \delta_{BF}-\tan \delta_{SL})/\tan \delta_{BF}$ is most preferably not greater than 10%.

Furthermore, both the rubber that constitutes the side reinforcing layer 11 and the rubber that constitutes the bead filler 6 have JIS hardness at 20° C. in the range from 75 to 79. In particular, the JIS hardness at 20° C. of the rubber that constitutes the bead filler 6 is preferably greater than the JIS hardness of 20° C. of the rubber that constitutes the side reinforcing layer 11.

In the side reinforcing layer 11 and the bead filler 6, a ratio (s/S) of a cross-sectional area s of the bead filler 6 to a cross-sectional area S of the side reinforcing layer 11 is preferably in the range from 0.15 to 0.35. Additionally, a maximum thickness Tm of the side reinforcing layer 11 is preferably in the range from 8.5 mm to 11.5 mm. Note that the maximum thickness Tm of the side reinforcing layer 11 is the maximum value of the rubber thickness measured along a direction orthogonal to an inner circumferential surface of the carcass layer 4.

In the pneumatic tire described above, as the physical properties of the rubber that constitutes the side reinforcing layer 11 and the rubber that constitutes the bead filler 6, the modulus M100 at 100% elongation is in the range from 8.4 MPa to 10.2 MPa, and thus the generation of peeling off of the carcass layer 4 located between the side reinforcing layer 11 and the bead filler 6 can be prevented, and run-flat durability can be improved. In addition, since the rubbers have the tan δ at 60° C. in the range from 0.04 to 0.08 and are low heat build-up rubbers, heat build-up under run-flat travel conditions is suppressed, and rolling resistance can be reduced. Furthermore, since the JIS hardness at 20° C. is in the range from 75 to 79, run-flat durability and ride comfort under normal travel conditions can be improved in a well-balanced manner. By setting the physical properties of the rubbers that constitute each of the side reinforcing layer 11 and the bead filler 6 in a specific range in this way, the difference in the physical properties between the rubber that constitutes the side reinforcing layer 11 and the rubber that constitutes the bead filler 6 can be reduced without increasing the cross-sectional area or thickness of the rubber that constitutes the side reinforcing layer 11. In this way, rolling resistance can be reduced while improving run-flat durability, and ride comfort under normal travel conditions can be improved.

On the other hand, when the modulus M100 is less than 8.4 MPa or greater than 10.2 MPa, peeling off of the carcass layer 4 is easily generated, and run-flat durability tends to deteriorate. In addition, the smaller tan δ at 60° C. can suppress the heat build-up under run-flat travel conditions, but it is difficult to set the tan δ less than 0.04, and when the tan δ is greater than 0.08, heat build-up under run-flat travel conditions is easily generated, and rolling resistance tends to deteriorate. Furthermore, when the JIS hardness at 20° C. is less than 75, run-flat durability is insufficient, and when the JIS hardness is greater than 79, ride comfort under normal travel conditions deteriorates.

In the drawing, an outer reinforcing layer 14 that overlaps the bead filler 6 and the side reinforcing layer 11 in the tire radial direction is disposed on an outer side in the tire width direction of the carcass layer 4 in the sidewall portions 2. In the embodiment in the drawing, one end of the outer reinforcing layer 14 is located at a middle part of the bead filler 6, while the other end is located at a middle part of the side reinforcing layer 11, extending along the tire radial direction. By disposing the outer reinforcing layer 14 on the outer side in the tire width direction of the carcass layer 4 in the sidewall portions 2, casing stiffness can be effectively improved, and shear stress applied to the carcass layer 4 under run-flat travel conditions can be suppressed while avoiding adverse effects on ride comfort under normal travel conditions.

As the physical properties of the rubber that constitutes the outer reinforcing layer 14, the modulus at 100% elongation is preferably in the range from 5.2 MPa to 6.4 MPa and the JIS hardness at 20° C. is preferably in the range from 70 to 74. The rubber that constitutes the outer reinforcing layer 14 has the physical properties described above, and thus ride comfort under normal travel conditions can be improved while maintaining run-flat durability.

In the pneumatic tire described above, the height from a bead heel 3A of the bead portion 3 to the position of the maximum thickness Tm of the side reinforcing layer 11 is defined as a height HW and the height from the bead heel 3A of the bead portion 3 to an outer end portion in the tire radial direction of the outer reinforcing layer 14 is defined as a height H1. At this time, the height HW of the side reinforcing layer 11 and the height H1 of the outer reinforcing layer 14 preferably satisfy the relationship 0.6≤H1/HW≤0.8. Furthermore, the height H1 of the outer reinforcing layer 14 and a height H2 of the bead filler 6 described later more preferably satisfy the relationship H1>H2. By appropriately setting a ratio of the height H1 of the outer reinforcing layer 14 to the height HW of the side reinforcing layer 11 in this way, deformation around the bead portions 3 is suppressed, and a bend point of the sidewall portions 2 under run-flat travel conditions is moved toward a side of the tread portion 1, and run-flat durability can be effectively improved. Here, when the ratio of the height H1 of the outer reinforcing layer 14 to the height HW of the side reinforcing layer 11 is less than 0.6, the tire weight can be reduced, but the run-flat durability cannot be sufficiently improved. On the other hand, when the above-described ratio is greater than 0.8, run-flat durability can be improved, but the tire weight increases and rolling resistance tends to deteriorate.

A height from the bead heel 3A of the bead portion 3 to an end portion on an outer side in the tire radial direction of the bead filler 6 is defined as a height H2. At this time, the height HW of the side reinforcing layer 11 and the height H2 of the bead filler 6 preferably satisfy the relationship 0.35≤H2/HW≤0.50. By appropriately setting a ratio of the height H2 of the bead filler 6 to the height HW of the side reinforcing layer 11 in this way, the bend point of the sidewall portions 2 under run-flat travel conditions is moved toward the side of the tread portion 1, and thus the tire weight can be reduced while maintaining run-flat durability even when the side reinforcing layer 11 is made thinner than in the related art. Here, when the ratio of the height H2 of the bead filler 6 to the height HW of the side reinforcing layer 11 is less than 0.35, ride comfort under normal travel conditions tends to deteriorate, and when the ratio is greater than 0.50, rolling resistance tends to deteriorate.

Additionally, a ratio of a width BW of the belt layers 8 located on the outermost side in the tire radial direction to a ground contact width W is preferably in the range from 101% to 110%, and an amount of overlap L between the belt layers 8 located on the innermost side in the tire radial direction and the side reinforcing layer 11 is preferably in the range from 15 mm to 30 mm. By appropriately setting the ratio of the width BW of the belt layers 8 to the ground contact width W and the amount of overlap L of the belt layers 8 and the side reinforcing layer 11 in this way, run-flat durability can be effectively improved. Here, when the ratio of the width BW of the belt layers 8 to the ground contact width W is less than 101%, the reinforcing effect of the belt layers 8 cannot be sufficiently obtained. on the other hand, when the ratio is greater than 110%, the tire weight increases and rolling resistance tends to deteriorate. Note that the amount of overlap L between the belt layers 8 and the side reinforcing layer 11 is a length obtained by measuring a portion where the belt layers 8 and the side reinforcing layer 11 overlap each other along the extending direction of the belt layers 8.

In embodiments of the present technology, a cord angle of the belt layers 8 with respect to the tire circumferential direction is preferably in the range from 25° to 35°, and preferably at least one belt cover layer 9 that covers the entire width of the belt layers 8 is disposed on the outer circumferential side of the belt layers 8. By appropriately setting the cord angle of the belt layers 8 and providing the belt cover layer 9 that constitutes the full cover in this way, buckling of the tread portion 1 is suppressed, and the run-flat durability can be effectively improved. Here, when the cord angle is less than 25°, the component in the tire width direction of the cord is insufficient, and the buckling of the tread portion 1 cannot be sufficiently suppressed, and when the cord angle is greater than 35°, tire performance under normal travel conditions cannot be sufficiently obtained.

When embodiments of the present technology are applied to a pneumatic tire having a high tire cross-sectional height, the obtained effect is significant. In such a pneumatic tire having the high tire cross-sectional height, the tire cross-sectional height is preferably in the range from 115 mm to 145 mm.

EXAMPLES

Tires of Conventional Example, Comparative Example 1 to 3, and Example 1 to 9 are manufactured, in which, in pneumatic tires having a tire size of 235/60RF18 and including: a tread portion having an annular shape and extending in a tire circumferential direction, a pair of sidewall portions disposed on both sides of the tread portion, and a pair of bead portions disposed on inner sides in a tire radial direction of the pair of sidewall portions, at least one carcass layer being mounted between the pair of bead portions, the carcass layer being turned up from a tire inner side to a tire outer side around a bead core of each of the bead portions, a bead filler being disposed on an outer circumferential side of the bead core in each of the bead portions, a plurality of belt layers being disposed on an outer circumferential side of the carcass layer in the tread portion, a side reinforcing layer having a crescent-shaped cross-section being disposed on the inner side in a tire width direction of the carcass layer in each of the pair of sidewall portions, the following are set as shown in Table 1: a M100, a tan δ (60° C.) and JIS hardness (20° C.) of a rubber that constitutes the side reinforcing layer and a rubber that constitutes the bead filler, the presence/absence of an outer reinforcing layer, a M100, and JIS hardness (20° C.) of a rubber that constitutes the outer reinforcing layer, a ratio (H1/HW) of a height H1 of the outer reinforcing layer to a height HW of the side reinforcing layer, a ratio (H2/HW) of a height H2 of the bead filler to the height HW of the side reinforcing layer, a ratio (BW/W×100%) of a width BW of the belt layers to a ground contact width W, an amount of overlap L between the belt layers and the side reinforcing layer, a cord angle of the belt layers, and the presence/absence of the belt cover layer of the full cover.

The rolling resistance, ride comfort, and run-flat durability are evaluated for these test tires according to the following test methods, and the results of the evaluation are shown in Table 1.

Rolling Resistance:
Each of the test tires is mounted on a wheel having a rim size of 18×7.5J, and rolling resistance is measured by using a drum testing machine at air pressure of 210 kPa. Evaluation results are expressed as index values with the value of the Conventional Example being defined as 100. Smaller index values indicate less rolling resistance.

Ride Comfort:
Each of the test tires is mounted on a wheel having a rim size of 18×7.5J, assembled on a test vehicle having engine displacement of 2500 cc, and sensory evaluations are performed by a test driver under the condition of air pressure of 250 kPa. Evaluation results are expressed by the 5-point method with the value of the Conventional Example being defined as the reference point 3. Larger evaluation values indicate superior ride comfort.

Run-Flat Durability:
Each of the test tires is assembled on a wheel having a rim size of 18×7.5J, and a running test is performed by using a drum testing machine under the condition of air pressure of 0 kPa and 65% of the maximum load capacity defined by JATMA (The Japan Automobile Tyre Manufacturers Association, Inc.) or ETRTO (The European Tyre and Rim Technical Organisation) as a load. More specifically, a running speed of 80 km/h is used, and the tires are run until the tire failure occurs, and running distances are measured. Evaluation results are expressed as index values with the value of the Conventional Example being defined as 100. Larger index values indicate superior run-flat durability.

TABLE 1

|  |  | Conventional Example | Comparative Example 1 | Comparative Example 2 | Comparative Example 3 |
| --- | --- | --- | --- | --- | --- |
| Side reinforcing layer | M100 (MPa) | 9.3 | 8.0 | 9.3 | 10.5 |
|  | tan δ (60° C.) | 0.06 | 0.03 | 0.06 | 0.09 |
|  | JIS hardness (20° C.) | 77 | 77 | 77 | 77 |
| Bead filler | M100 (MPa) | 10.1 | 9.3 | 8.0 | 10.5 |
|  | tan δ (60° C.) | 0.15 | 0.06 | 0.03 | 0.09 |
|  | JIS hardness (20° C.) | 91 | 77 | 77 | 77 |
| Outer reinforcing layer | Presence/absence | No | No | No | No |
|  | M100 (MPa) | — | — | — | — |
|  | JIS hardness (20° C.) | — | — | — | — |
| Ratio (H1/HW) of height H1 of outer reinforcing layer to height HW of side reinforcing layer |  | — | — | — | — |
| Ratio (H2/HW) of height H2 of bead filler to height HW of side reinforcing layer |  | 0.6 | 0.6 | 0.6 | 0.6 |
| Ratio of width BW of belt layer to ground contact width W (BW/W × 100%) |  | 100 | 100 | 100 | 100 |
| Amount of overlap L (mm) between belt layer and side reinforcing layer |  | 10 | 10 | 10 | 10 |
| Cord angle of belt layer (deg) |  | 22 | 22 | 22 | 22 |
| Presence/absence of belt cover layer of full cover |  | No | No | No | No |
| Rolling resistance |  | 100 | 101 | 101 | 102 |
| Ride comfort |  | 3.0 | 3.5 | 3.5 | 3.5 |
| Run-flat durability |  | 100 | 99 | 99 | 98 |

TABLE 1-continued

|  |  | Example 1 | Example 2 | Example 3 | Example 4 | Example 5 |
|---|---|---|---|---|---|---|
| Side reinforcing layer | M100 (MPa) | 9.3 | 8.4 | 8.8 | 9.3 | 9.3 |
|  | tan δ (60° C.) | 0.06 | 0.04 | 0.055 | 0.06 | 0.06 |
|  | JIS hardness (20° C.) | 77 | 77 | 77 | 77 | 77 |
| Bead filler | M100 (MPa) | 9.3 | 10.2 | 9.5 | 9.3 | 9.3 |
|  | tan δ (60° C.) | 0.06 | 0.08 | 0.06 | 0.06 | 0.06 |
|  | JIS hardness (20° C.) | 77 | 79 | 79 | 77 | 77 |
| Outer reinforcing layer | Presence/absence | No | No | No | Yes | Yes |
|  | M100 (MPa) | — | — | — | 10.1 | 10.1 |
|  | JIS hardness (20° C.) | — | — | — | 91 | 91 |
| Ratio (H1/HW) of height H1 of outer reinforcing layer to height HW of side reinforcing layer |  | — | — | — | 0.5 | 0.7 |
| Ratio (H2/HW) of height H2 of bead filler to height HW of side reinforcing layer |  | 0.6 | 0.6 | 0.6 | 0.6 | 0.6 |
| Ratio of width BW of belt layer to ground contact width W (BW/W × 100%) |  | 100 | 100 | 100 | 100 | 100 |
| Amount of overlap L (mm) between belt layer and side reinforcing layer |  | 10 | 10 | 10 | 10 | 10 |
| Cord angle of belt layer (deg) |  | 22 | 22 | 22 | 22 | 22 |
| Presence/absence of belt cover layer of full cover |  | No | No | No | No | No |
| Rolling resistance |  | 98 | 99 | 98 | 98 | 99 |
| Ride comfort |  | 3.5 | 3.25 | 3.5 | 3.5 | 3.5 |
| Run-flat durability |  | 101 | 101 | 101 | 103 | 104 |

|  |  | Example 6 | Example 7 | Example 8 | Example 9 |
|---|---|---|---|---|---|
| Side reinforcing layer | M100 (MPa) | 9.3 | 9.3 | 9.3 | 9.3 |
|  | tan δ (60° C.) | 0.06 | 0.06 | 0.06 | 0.06 |
|  | JIS hardness (20° C.) | 77 | 77 | 77 | 77 |
| Bead filler | M100 (MPa) | 9.3 | 9.3 | 9.3 | 9.3 |
|  | tan δ (60° C.) | 0.06 | 0.06 | 0.06 | 0.06 |
|  | JIS hardness (20° C.) | 77 | 77 | 77 | 77 |
| Outer reinforcing layer | Presence/absence | Yes | Yes | Yes | Yes |
|  | M100 (MPa) | 5.8 | 5.8 | 5.8 | 5.8 |
|  | JIS hardness (20° C.) | 72 | 72 | 72 | 72 |
| Ratio (H1/HW) of height H1 of outer reinforcing layer to height HW of side reinforcing layer |  | 0.7 | 0.7 | 0.7 | 0.7 |
| Ratio (H2/HW) of height H2 of bead filler to height HW of side reinforcing layer |  | 0.6 | 0.4 | 0.4 | 0.4 |
| Ratio of width BW of belt layer to ground contact width W (BW/W × 100%) |  | 100 | 100 | 103 | 103 |
| Amount of overlap L (mm) between belt layer and side reinforcing layer |  | 10 | 10 | 20 | 20 |
| Cord angle of belt layer (deg) |  | 22 | 22 | 22 | 29 |
| Presence/absence of belt cover layer of full cover |  | No | No | No | Yes |
| Rolling resistance |  | 97 | 96 | 97 | 97 |
| Ride comfort |  | 4.0 | 4.5 | 4.5 | 4.5 |
| Run-flat durability |  | 104 | 104 | 105 | 106 |

As can be seen from Table 1, as compared to Conventional Example, in the pneumatic tires according to Examples 1 to 9, rolling resistance is reduced while improving run-flat durability, and ride comfort is improved.

On the other hand, in Comparative Example 1, the M100 and the tan δ (60° C.) of the rubber that constitutes the side reinforcing layer are set outside the ranges specified in embodiments of the present technology, and in Comparative Example 2, the M100 and the tan δ (60° C.) of the rubber that constitutes the bead filler are set outside the ranges specified in embodiments of the present technology, and thus the effects of improving rolling resistance and run-flat durability are not sufficient. Furthermore, in Comparative Example 3, the M100 and the tan δ (60° C.) of the rubbers that constitute each of the side reinforcing layer and bead filler are set outside the ranges specified in embodiments of the present technology, and thus the effects of improving rolling resistance and run-flat durability are not sufficient.

The invention claimed is:
1. A pneumatic tire, comprising:
a tread portion having an annular shape and extending in a tire circumferential direction;
a pair of sidewall portions disposed on both sides of the tread portion; and
a pair of bead portions disposed on inner sides in a tire radial direction of the pair of sidewall portions,
at least one carcass layer being mounted between the pair of bead portions,
the carcass layer being turned up from a tire inner side to a tire outer side around a bead core of each of the pair of bead portions, a bead filler being disposed on an outer circumferential side of the bead core in each of the pair of bead portions, a plurality of belt layers being disposed on an outer circumferential side of the carcass layer in the tread portion, and a side reinforcing layer having a crescent-shaped cross-section being disposed on an inner side in a tire width direction of the carcass layer in each of the pair of sidewall portions, and as physical properties of a rubber that constitutes the side reinforcing layer and a rubber that constitutes the bead filler, a modulus at 100% elongation being in a range from 8.4 MPa to 10.2 MPa, a tan δ at 60° C. being in a range from 0.04 to 0.08, and JIS hardness at 20° C. being in a range from 75 to 79, wherein an outer reinforcing layer that overlaps the bead filler and the side reinforcing layer in the tire radial direction is disposed on an outer side in the tire width direction of the carcass layer in each of the pair of sidewall portions, and as physical properties of a rubber that constitutes the outer reinforcing layer, a modulus at 100% elongation is in a range from 5.2 MPa to 6.4 MPa and JIS hardness at 20° C. is in a range from 70 to 74.

2. The pneumatic tire according to claim 1, wherein a height HW from a bead heel of each of the pair of bead portions to a maximum thickness position of the side reinforcing layer and a height H2 from the bead heel of each of the pair of bead portions to an outer end portion in the tire radial direction of the bead filler satisfy the relationship 0.35≤H2/HW≤0.50.

3. The pneumatic tire according to claim 1, wherein a ratio of a width of the belt layer located on an outermost side in the tire radial direction to a ground contact width is in a range from 101% to 110%, and an amount of overlap between the belt layer located on an innermost side in the tire radial direction and the side reinforcing layer is preferably in a range from 15 mm to 30 mm.

4. The pneumatic tire according to claim 1, wherein a cord angle of the belt layer with respect to the tire circumferential direction is in a range from 25° to 35°, and at least one belt cover layer that covers an entire width of the belt layer is disposed on an outer circumferential side of the belt layer.

5. The pneumatic tire according to claim 1, wherein a height HW from a bead heel of each of the pair of bead portions to a maximum thickness position of the side reinforcing layer and a height H1 from the bead heel of each of the pair of bead portions to an outer end portion in the tire radial direction of the outer reinforcing layer satisfy the relationship 0.6≤H1/HW≤0.8.

6. The pneumatic tire according to claim 5, wherein the height HW from the bead heel of each of the pair of bead portions to a maximum thickness position of the side reinforcing layer and a height H2 from the bead heel of each of the pair of bead portions to the outer end portion in the tire radial direction of the bead filler satisfy the relationship 0.35≤H2/HW≤0.50.

7. The pneumatic tire according to claim 6, wherein a ratio of a width of the belt layer located on an outermost side in the tire radial direction to a ground contact width is in a range from 101% to 110%, and an amount of overlap between the belt layer located on an innermost side in the tire radial direction and the side reinforcing layer is preferably in a range from 15 mm to 30 mm.

8. The pneumatic tire according to claim 7, wherein a cord angle of the belt layer with respect to the tire circumferential direction is in a range from 25° to 35°, and at least one belt cover layer that covers an entire width of the belt layer is disposed on an outer circumferential side of the belt layer.

* * * * *